(12) United States Patent
Komatsu et al.

(10) Patent No.: US 7,227,718 B2
(45) Date of Patent: Jun. 5, 2007

(54) FRONT SHUTTER ATTACHING STRUCTURE AND FLEXIBLE DISK DRIVE HAVING THE SAME

(75) Inventors: Hisateru Komatsu, Tendo (JP); Makoto Konno, Tendo (JP); Noriyuki Kobayashi, Tendo (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 416 days.

(21) Appl. No.: 10/767,892

(22) Filed: Jan. 28, 2004

(65) Prior Publication Data

US 2004/0184186 A1  Sep. 23, 2004

(30) Foreign Application Priority Data

Jan. 29, 2003  (JP) ............................. 2003-020366

(51) Int. Cl.
*G11B 5/016* (2006.01)
(52) U.S. Cl. .................................... 360/99.02; 720/647
(58) Field of Classification Search ..................... None
See application file for complete search history.

(56) References Cited

U.S. PATENT DOCUMENTS 5,648,882 A * 7/1997 Tangi et al. .............. 360/99.06
6,807,026 B2 * 10/2004 Komatsu et al. ......... 360/99.02

* cited by examiner

*Primary Examiner*—David Davis
(74) *Attorney, Agent, or Firm*—Frishauf, Holtz, Goodman & Chick, P.C.

(57) ABSTRACT

A front shutter (13') comprises arm portions (132, 133) formed at both ends of an upper side of a door member (131). While one shaft portion (136) is formed on one of the arm portions (132) through a positioning portion (134), the other shaft portion (137) is formed on the other of the arm portions (133). The shaft portions (136, 137') are inserted into holes formed on a cut and raised piece (111) and a side wall (112) respectively. The cut and raised piece (111) and the side wall (112) rotatably supports the shaft portions (136, 137'). A gap between the arm portion (133) and the side wall (112) is wider because of no positioning portion between the arm portion (133) and the side wall (112). The shutter spring (14') not only gives force to the front shutter (13') in a closing direction but also presses the front shutter toward the cut and raised piece (111) to prevent the shutter from moving along a pivot defined by the shaft portions (136, 137').

13 Claims, 4 Drawing Sheets

FRONT SHUTTER ATTACHING STRUCTURE AND FLEXIBLE DISK DRIVE HAVING THE SAME

This application claims priority to prior Japanese application JP 2003-20366, the disclosure of which is incorporated herein by reference.

BACKGROUND OF THE INVENTION

This invention relates to a flexible disk drive, in particular, to a front shutter structure thereof.

The flexible disk drive defines a loading slot for loading a flexible (magnetic) disk. Generally, to the loading slot, a single swing front shutter is attached. The front shutter always receives turning force (or resilience) from a shutter spring in a closing direction. Insertion of the flexible disk into the flexible disk drive is made by pushing open the shutter against the resilience of the shutter spring.

A related flexible disk drive comprises a front shutter and a main frame with a pair of supporting plates for rotatably supporting the-front shutter.

The front shutter of the related flexible disk drive comprises a door portion having an approximately rectangular board shape, and a pair of shaft portions which are formed at both ends of a long side of the door portion and which project from the door portion. The shaft portions have a common center axis and serves as a pivot for swing of the door portion. At bases of the shaft portions, positioning portions are formed. The positioning portions restrict movable range of the door portion in a direction along the pivot when the front shutter is attached to the related flexible disk drive.

On the other hand, the supporting plates of the related flexible disk drive are opposed to each other and define holes which are inserted with the shaft portions of the front shutter. The positioning portions of the front shutter have an outside diameter larger than an inside diameter of the holes of the supporting plates. Accordingly, the supporting plates rotatably support the front shutter in a state where only the shaft portions of the front shutter are inserted into the holes of the supporting plates.

As mentioned above, the related flexible disk drive includes the positioning portions formed on the front shutter to restrict the movable range of the front shutter in the direction along the pivot. A distance between top sides of the positioning portions is slightly shorter than an interval between the supporting plates for supporting the front shutter. That is, a narrow gap is remained between one of the positioning portions and one of the supporting plates when the other of the positioning plates is close into contact with the other of the supporting plates. The gap between the positioning portion and the supporting plate allows the front shutter to swing smoothly.

However, the gap between the positioning portion and the supporting plate is easy to be eliminated by a little deformation of the supporting plates (or the main frame). Absence of the gap between the positioning portion and the supporting plate makes swing of the front shutter difficult or impossible. That is, the supporting plates are in contact with the positioning portions simultaneously and impede the swing of the front shutter.

Thus, the related flexible disk drive has an apprehension that the little deformation of the supporting plates or the main frame makes the swing of the front shutter difficult or impossible.

SUMMARY OF THE INVENTION

Accordingly, it is an object of this invention to provide a shutter attaching structure which has tolerance for deformation of supporting plates for supporting a single swing shutter.

Other objects of the present invention will become clear as the description proceeds.

According to a first aspect of the present invention, a shutter attaching structure comprises a shutter having first and second shaft portions which serve as a pivot. First and second supporting plates support the first and the second shaft portions so that the shutter can rotate on the pivot. A spring member gives the shutter pressing force directed to the first supporting plate along the pivot.

According to a second aspect of this invention, a flexible disk drive comprises a front shutter having first and second shaft portions which serve as a pivot. First and second supporting plates support the first and the second shaft portions so that the front shutter can rotate on the pivot. A spring member gives the front shutter pressing force directed to the first supporting plate along the pivot.

DESCRIPTION OF THE PREFERRED EMBODIMENT

Figure 1:
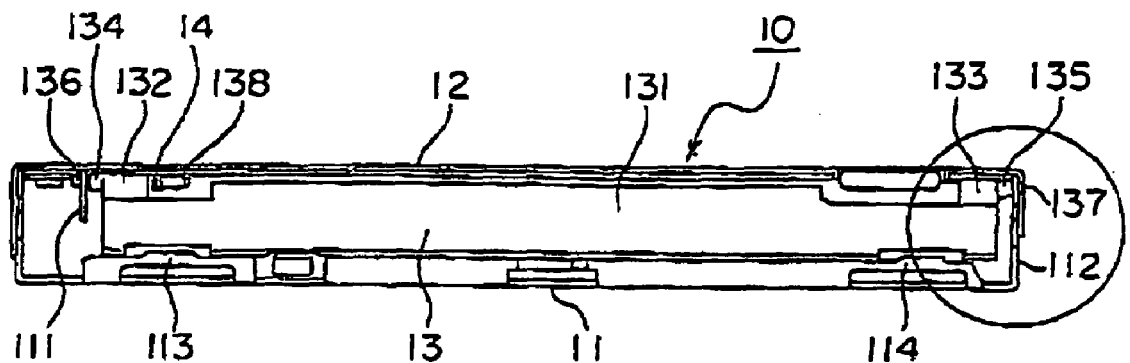
FIG. 1 is a front view of a related flexible disk drive.
Figure 2:
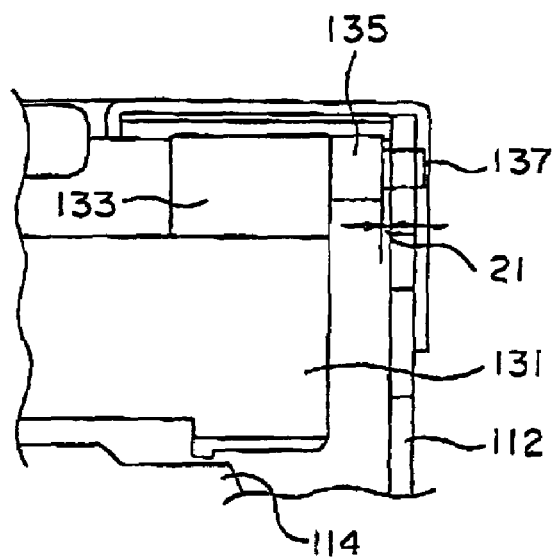
FIG. 2 is an expanded view showing a part enclosed in a circle shown in FIG. 1.

Referring to FIGS. 1 and 2, description will be at first directed to a related shutter attaching structure.

FIG. 1 is a front view of a related flexible disk drive 10 which adopts the related shutter attaching structure. The flexible disk drive 10 has no front panel (or a front panel is detached from the flexible disk drive). FIG. 2 is expanded view showing inside of a circle shown in FIG. 1.

As shown in FIG. 1, the flexible disk drive 10 comprises a main frame 11 for defining internal space thereof. An upper cover 12 covers the upper side of the main frame 11. A front shutter 13 is attached to the vicinity of a front edge of the main frame 11.

The front shutter comprises a door portion 131 having a main surface with an approximately rectangular shape. Arm portions 132 and 133 are formed on notches at both ends of an upper side of the door portion 131 to protrude backward obliquely (or toward upper reverse side of FIG. 1). Positioning portions 134 and 135 are formed on the arm portions 132, 133 to protrude toward opposite sides (or right and left sides of FIG. 1). Shaft portions 136 and 137 are formed on the positioning portions 134 and 135 to further project toward the opposite sides. A spring shaft 138 is formed on the positioning portion 134 to project in a direction opposite to the shaft portion 136.

The shaft portions 136 and 137 have a common central axis and serves as a pivot. The positioning portions 134 and 135 are concentric with the shaft portions 136 and 137 and have an outer diameter larger than that of the shaft portions 136 and 137.

The main frame 11 includes a cut and raised piece 111 and a side wall portion 112 which are opposed to each other. The cut and raised piece 111 and the side wall portion 112 will be referred to as supporting plates. The supporting plates 111 and 112 define holes (or through holes).

The front shutter 13 is rotatably attached to the main frame 11 by insertion of the shaft portions 136 and 137 into the holes of the supporting plates 111 and 112. The attachment of the front shutter 13 to the main frame 11 is achieved by curving the front shutter 13. The outer diameter of the positioning portions 134 and 135 is larger than an inner diameter of the holes of the supporting plates 111 and 112 and thereby the positioning portions 134 and 135 keep out of the holes. The positioning portions 134 and 135 restrict the movable range of the front shutter 13 with respect to a direction along the pivot. A distance between top ends of the positioning portions 134 and 135 is slightly shorter than an interval between the supporting plates 111 and 112. Accordingly, as illustrated in FIG. 2, a narrow gap 21 remains between the positioning portion 135 and the side wall 112 for instance. Thus, the front shutter 13 can swing against the main frame 11 on the condition that it does not receives a turning force from a shutter spring 14.

The shutter spring 14 is attached to the spring shaft 138 to give the turning force to the front shutter 13 attached to the main frame 11. The front shutter 13 always receives the turning force of a closing direction (or a direction that a lower edge of the door portion 131 moves toward the front side of FIG. 1) from the shutter spring 14 to shut a loading slot of the flexible disk drive.

The main frame 11 has bent pieces 113 and 114 to partially engage with the lower edge of the door portion 131. The bent pieces 113 and 114 has top end portions for engaging with the door portion 131 and stop the rotation of the front shutter 13 to close the loading slot of the flexible disk drive.

In the related shutter attaching structure, it is desirable to make the gap 21 as narrow as possible to reduce the movable range of the front shutter 13 with respect to the direction along the pivot. However, the narrower gap 21 is easily eliminated by a little deformation of the main frame 11. When the gap 21 is absent, it is difficult or impossible for the front shutter to rotate against the main frame 11.

Referring to FIGS. 3 to 6, the description will proceed to a front shutter attaching structure according to a preferred embodiment of this invention. Similar parts are designated by the same reference number.

Figure 3:
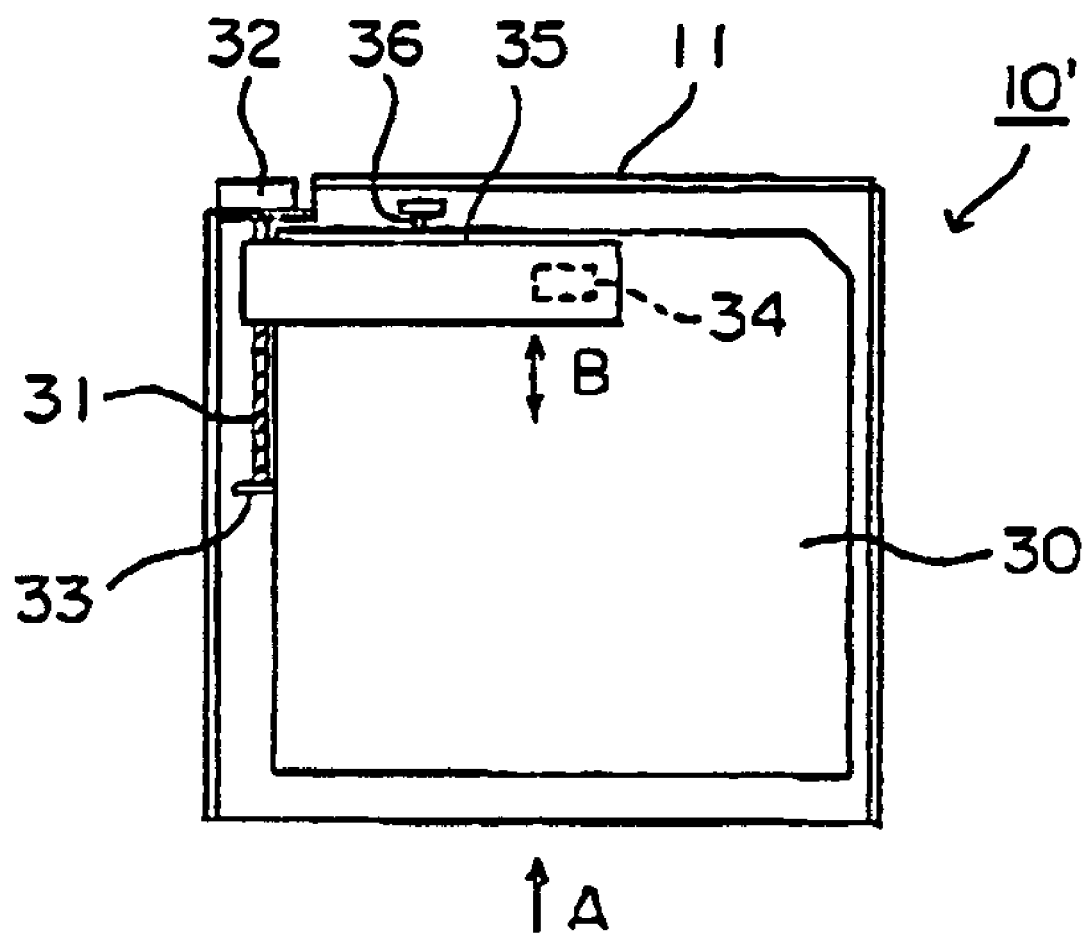
FIG. 3 is a plane view for describing a flexible disk drive to which a shutter attaching structure of this invention is applicable.

FIG. 3 shows a flexible disk drive 10' to which the front shutter attaching structure is applicable. The flexible disk drive 10' comprises a main frame 11 defining an internal space for receiving a flexible disk 30. The main frame 11 has length (or a distance along an up and down direction of FIG. 3) and width (or a distance along a right and left direction of FIG. 3) which are one size (about 10 mm in maximum each) larger than the length and width of a flexible disk 30. The flexible disk 30 is inserted into the flexible disk drive 10' from a direction depicted by an arrow A. That is, a loading slot of the flexible disk drive 10' is provided at a lower side of FIG. 3.

A stepping motor 32 is mounted at a left side of a back wall (or an upper side of FIG. 3) of the main frame 11 to rotate the sending screw 31 fixed thereto. The sending screw 31 extends in parallel to a side wall of the main frame 11 and has a tip portion which is rotatably supported by a supporting portion 33. A magnetic head 34 is mounted on a carriage 35 having an engaging portion engaging with the sending screw 31. The carriage 35 extends along a direction (i.e. a right and left direction of FIG. 3) perpendicular to the sending screw 33. The carriage 35 is slidably attached to a guide bar 36 fixed to a main surface of the main frame 11 and parallel to the sending screw 31.

When the stepping motor 32 rotates the sending screw 31, the guide bar 36 prevents the carriage 35 from rotating together with th sending screw 31 and the sending screw 31 shift the carriage 35 in a direction depicted by a double-headed arrow B. Thus, the magnetic heat 34 moves in a radial direction if the flexible disk 30 with rotation of the stepping motor 32.

In the flexible disk drive 10', the loading slot is located on the right side of FIG. 3 because the sending screw 31 is located on the left side.

Figure 4:
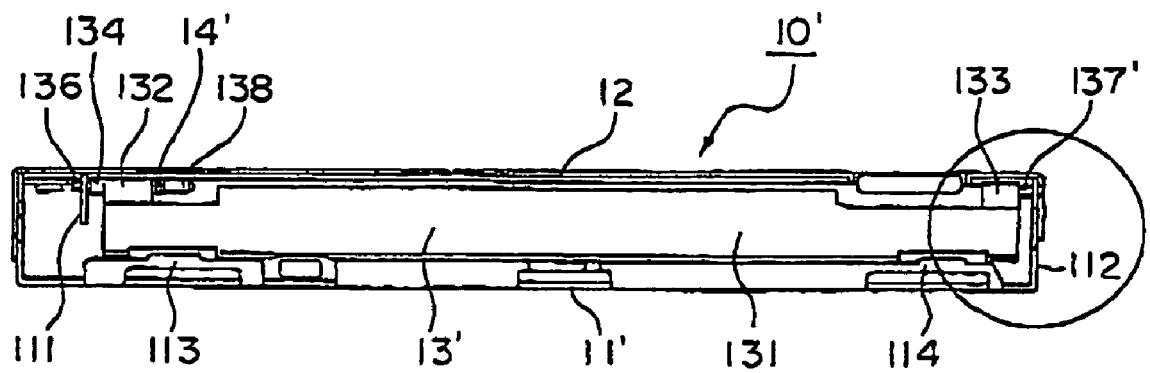
FIG. 4 is a front view of a flexible disk drive according to a preferred embodiment of this invention.

FIG. 4 is a front view of the flexible disk drive 10'. The flexible disk drive 10' differs from the related flexible disk drive 10 of FIG. 1 in that a shaft portion 137' of FIG. 4 is directly formed on the arm portion 133 while the front shutter 13 of FIG. 1 includes the positioning portion 135 between the arm portion 133 and the shaft portion 137. That is, a front shutter 13' of the flexible disk drive 10' is similar to the front shutter 13 of FIG. 1 except for the positioning portion 135.

Furthermore, the flexible disk drive 10' of FIG. 4 differs from the related flexible disk drive 10 of FIG. 1 in that a shutter spring 14' of FIG. 4 always gives not only the turning force of the closing direction but also pressing force of the left hand direction to the front shutter 13' while the shutter spring 14 of FIG. 1 gives only the turning force to the front shutter 13.

In the following, these differences will be described with referring to FIGS. 5, 6A and 6B.

Figure 5:
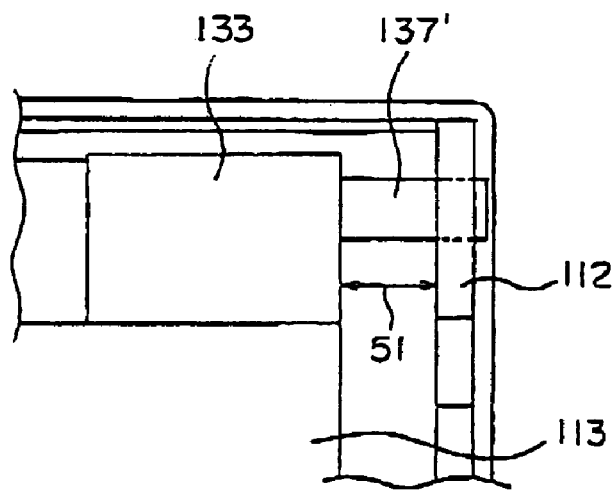
FIG. 5 is an expanded view showing a part enclosed in a circle shown in FIG. 4.

As shown in FIG. 5, the shaft portion 137' of the front shutter 13' is directly formed on the arm portion 133. That is, the front shutter 13' has no positioning portion between the arm portion 133 and the shaft portion 137'.

The shaft portion 137' has a length such that a tip portion thereof can be inserted into the hole of the side wall 112 of the main frame 11 when the shaft portion 136 is inserted into the hole of the cut and raised piece 111 and the front shutter 13' is moved leftward (or toward the cut and raised piece 111). In other words, the length of the shaft portions 136 and 137' is determined so that the tip of the shaft portion 137' can be inserted into the hole of the side wall 112 when the shaft portion 136 is most deeply inserted into the hole of the cut and raised piece 111. When the front shutter 13' is moved to the cut and raised piece 111, a wide gap 51 remains between the arm portion 133 and the sidewall 112. A distance between bases of the shaft portions 136 and 137' is a predetermined length shorter than a distance between the cut and raised piece 111 and the side wall 112. If the wide gap 51 is wider than the predetermined width (=the predetermined length), the front shutter 13' can rotate even if the main frame 11 is transformed. The predetermined width is determined on the basis of thickness of the side wall 112, an inner diameter of the hall formed in the side wall 112, an outer diameter of the shaft portion 137' or the like.

FIG. 5 shows a case where the width of the wide gap 51 is two and half times of the thickness of the side wall 112. In this case, the width of the wide gap is 1.5 mm when the thickness of the side wall is 0.6 mm.

Additionally, when the shaft portion 137' is most deeply inserted into the hole of the side wall 112, the shaft portion 136 may be so short that it does not reach the cut and raised piece 111. This permits the front shutter 13' to be attached to the main frame without curving the front shutter 13'.

Figure 6A:
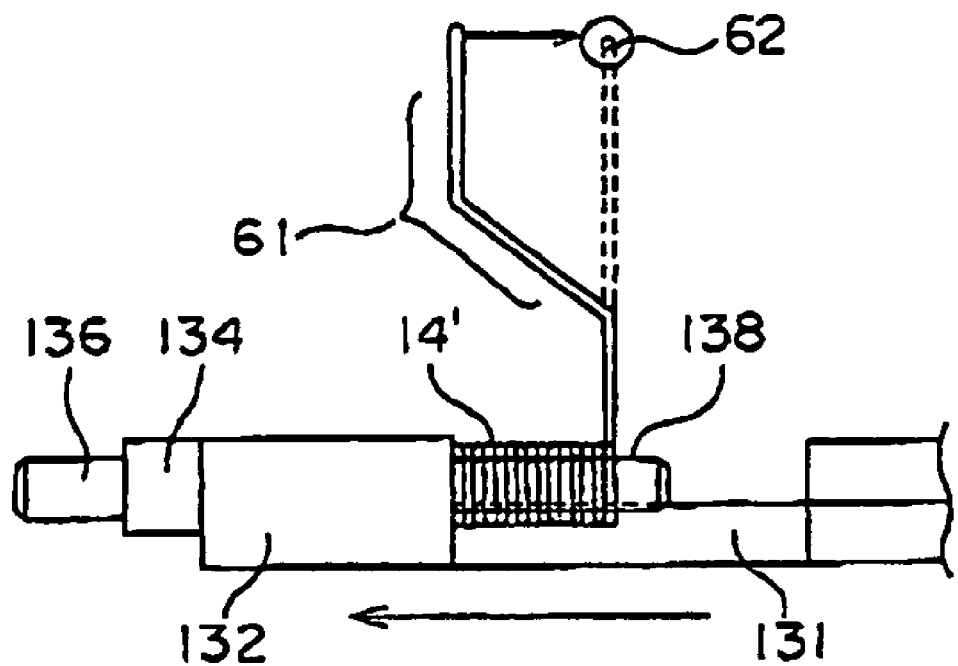
FIG. 6A is a plan view showing a shutter spring and vicinity included in the flexible disk drive of FIG. 4.
Figure 6B:
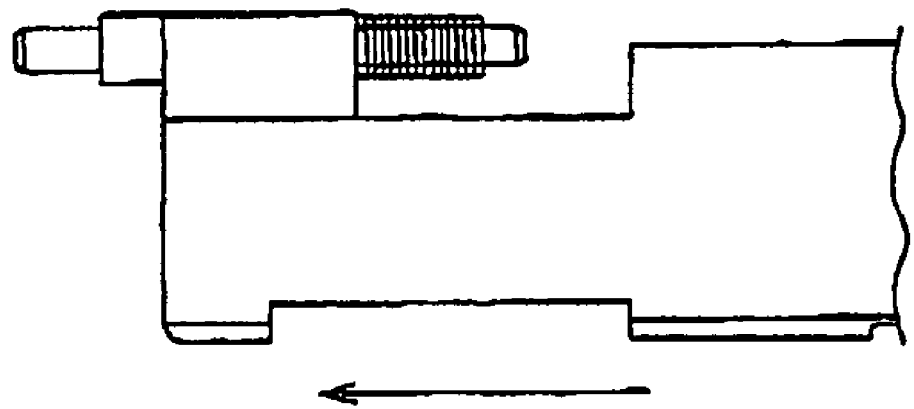
FIG. 6B is a front view showing a shutter spring and vicinity included in the flexible disk drive of FIG. 4.

As illustrated in FIG. 6A, the flexible disk drive 10' further comprises a shutter spring 14'. The shutter spring 14' has a fixed end portion to be fixed to the upper cover 12 and a bent portion 61 continuous with the fixed end portion. The fixed end portion of the shutter spring 14' forms a hook to engage with a receiving portion 62 of the upper cover 12. The receiving portion 62 is, for example, a circular edge portion which defines a hole formed in the upper cover 12 to receive the hook.

The bent portion 61 and vicinity thereof are elastically deformed while the hook engages with the receiving portion 62. That is, resilience of the shutter spring 14' always applies force directed toward a left side of FIG. 6A or 6B, or toward the cut and raised piece 111, to the front shutter 13' when the hook engages with the receiving portion 62. Consequently, the front shutter 13' is prevented from moving in left and right directions (or along the pivot) and the wide gap 51 is maintained between the arm portion 133 and the side wall 112.

Incidentally, the shutter spring 14 of the related shutter attaching structure has a fixed end portion and a straight portion continuous the fixed end portion. The straight portion is perpendicular to the spring shaft 138 as shown by broken lines in FIG. 6A while the fixed end portion engages with the receiving portion 62.

The cut and raised piece 111 is in inside of the flexible disk drive 10'. Accordingly, it is possible to assume that the cut and raised piece 111 receives no external force and maintains shape and/or posture thereof. Thus, there is some fear that the front shutter 13' is impossible to rotate only when the side wall 112 leans inside.

However, the shutter attaching structure of this embodiment has a wide gap 51 between the arm portion 133 (together with the door portion 131) and the side wall 112. Furthermore, the front shutter 13' receives the pressing force directed toward the cut and raised piece 111. Therefore, even if the main frame 11 is deformed and the side wall 112 leans inside to some extent, the front shutter 13' can rotate in this embodiment While this invention has thus far been described in conjunction with the preferred embodiment thereof, it will readily be possible for those skilled in the art to put this invention into practice in various other manners. For example, a bent piece which is an edge portion bent from the main frame may be used for the supporting plate for rotatably supporting the front shutter though the cut and raised piece 113 is used for the supporting plate in the above-mentioned description.

Furthermore, though the shutter spring 14' not only gives turning force to the front shutter in the closing direction but also presses the front shutter toward one of the shaft portions in the above-mentioned description, an additional pressing member, such as a spring, may be used for pressing the front shutter toward one of the shaft portions in addition to the related shutter spring 14.

What is claimed is:

1. A shutter attaching structure comprising:
   a shutter having first and second shaft portions which serve as a pivot;
   first and second supporting plates for supporting said first and said second shaft portions so that said shutter can rotate about said pivot; and
   a spring member for pressing said shutter toward said first supporting plate in a direction along said pivot.

2. A shutter attaching structure as claimed in claim 1, wherein:
   a distance between bases of said first and said second shaft portions is a predetermined length that is shorter than a distance between said first and said second supporting plates.

3. A shutter attaching structure as claimed in claim 1, wherein said shutter comprises:
   a door portion having a main surface with an approximately rectangular shape; and
   a first arm portion and a second arm portion formed at respective ends of a long side of said door portion for supporting said first and said second shaft portions.

4. A shutter attaching structure as claimed in claim 3, wherein:
   said first and said second supporting plates define holes for receiving said first and said second shaft portions;
   said first shaft portion is provided on a positioning portion which has an outside diameter larger than an inside diameter of said holes and which is formed on said first arm portion; and
   said second shaft portion is directly provided on said second arm portion.

5. A shutter attaching structure as claimed in claim 1, wherein said spring member serves as a shutter spring for applying a turning force to said shutter to urge said shutter to turn about said pivot.

6. A shutter attaching structure as claimed in claim 1, wherein said shutter comprises a front shutter of a flexible disk drive.

7. A shutter attaching structure as claimed in claim 6, wherein said first supporting plate comprises a bent piece of a main frame of said flexible disk drive.

8. A flexible disk drive comprising:
   a front shutter having first and second shaft portions which serve as a pivot;
   first and second supporting plates for supporting said first and said second shaft portions so that said front shutter can rotate about said pivot; and
   a spring member for pressing said front shutter toward said first supporting portion in a direction along said pivot.

9. A flexible disk drive as claimed in claim 8, wherein:
   a distance between bases of said first and said second shaft portions is a predetermined length that is shorter than a distance between said first and said second supporting plates.

10. A flexible disk drive as claimed in claim 8, wherein said front shutter comprises:
    a door portion having a main surface with an approximately rectangular shape; and
    a first arm portion and a second arm portion formed at respective ends of a long side of said door portion for supporting said first and said second shaft portions.

11. A flexible disk drive as claimed in claim 10, wherein:
    said first and said second supporting portions define holes for receiving said first and said second shaft portions;
    said first shaft portion is provided on a positioning portion which has outside measurements larger than inside measurements of said holes and which is formed on said first arm portion; and
    said second shaft portion is directly provided on said second arm portion.

12. A flexible disk drive as claimed in claim 8, wherein said spring member serves as a shutter spring for applying a turning force to said front shutter to urge said front shutter to turn about said pivot.

13. A flexible disk drive as claimed in claim 8, wherein said first plate comprises a bent piece of a main frame of said flexible disk drive.

* * * * *